United States Patent [19]

Yoshikawa et al.

[11] Patent Number: 4,743,224
[45] Date of Patent: May 10, 1988

[54] AUTOMATIC BELT TENSIONER

[75] Inventors: Hiroshi Yoshikawa, Mitaka; Naoto Muto, Fuchu; Kohichi Fukunaga, Hoya, all of Japan

[73] Assignee: Fuji Jukogyo Kabushiki Kaisha, Tokyo, Japan

[21] Appl. No.: 52,674

[22] Filed: May 20, 1987

[30] Foreign Application Priority Data

May 24, 1986 [JP] Japan .............................. 61-78359[U]

[51] Int. Cl.$^4$ .............................................. F16H 7/12
[52] U.S. Cl. .................................. 474/101; 474/109; 474/133
[58] Field of Search ............... 474/133, 135, 136, 138, 474/109-111, 101

[56] References Cited

U.S. PATENT DOCUMENTS

| 4,151,756 | 5/1979 | Binder et al. | 474/138 |
| 4,411,638 | 10/1983 | Wilson | 474/136 X |
| 4,525,153 | 6/1985 | Wilson | 474/136 |
| 4,539,001 | 9/1985 | Okabe | 474/138 |
| 4,573,952 | 3/1986 | Schulze | 474/133 X |
| 4,657,524 | 4/1987 | Okabe | 474/133 X |

FOREIGN PATENT DOCUMENTS 56-83647 7/1981 Japan .
57-40149 3/1982 Japan .

Primary Examiner—Stephen J. Novosad
Assistant Examiner—Thuy M. Bui
Attorney, Agent, or Firm—Martin A. Farber

[57] ABSTRACT

A belt tensioner has a shaft having an external thread and rotatably mounted in a body, a torsion spring provided between the body and the shaft so as to urge the shaft in a rotational direction, and a cylindrical rod having an internal thread engaged with the external thread of the shaft. An upper end of the rod being projected from the body so as to be operatively connected to a tension pulley for a belt. The torsion spring and both the threads are arranged to project rod by the rotation of the shaft urged by the torsion spring.

3 Claims, 3 Drawing Sheets

AUTOMATIC BELT TENSIONER

BACKGROUND OF THE INVENTION

The present invention relates to an automatic tensioner for tensing a belt such as a timing belt for an automotive engine and more particularly to a spring loaded screw type tensioner.

Japanese Patent Laid Open Nos. 56-83647 and 57-40149 disclose screw type tensioners applied to chain driven camshaft mechanisms. The tensioner has a shaft applied with torque by a torsion spring and an actuating rod having a thread engaged with a thread of the shaft. The shaft is urged by the spring in a rotational direction to project the actuating rod. When the tension of a chain decreases as a result of the expansion of the chain, the rod is projected by the rotation of the shaft to push a chain guide, thereby automatically tensing the chain.

In the screw type tensioner, since a large force is continuously exerted on the thread, a square threaded screw device having a high rigidity is employed. In the square threaded screw device, the amount of particles produced by abrasion of threads increase, due to large friction between the threads. Therefore, it is preferable to use oil having a low viscosity rather than grease for a sufficient lubrication. Accordingly, although the conventional tensioner can be applied to a chain drive device mounted inside an engine body in which engine oil splashes to lubricate the device, it cannot be applied to a timing belt drive device provided outside the engine body.

SUMMARY OF THE INVENTION

The object of the present invention is to provide an automatic belt tensioner wherein a reliably sealed lubricating system is provided so as to sufficiently lubricate threads of screws.

According to the present invention, there is provided an automatic belt tensioner comprising a substantially vertically disposed cylindrical body having an axial chamber, a shaft having an external thread and rotatably mounted in the axial chamber of the body, a torsion spring provided between the body and the shaft so as to urge the shaft in a rotational direction, a cylindrical rod having an axial bore and an internal thread engaged with the external thread of the shaft, an upper end of the rod being projected from the body so as to be operatively connected to a tension pulley for a belt holding means for holding the rod so as to permit axial movement of the rod, means for circulating oil between the axial chamber of the body and the bore of the rod at a portion above the internal thread of the rod, and sealing means provided between the body and the rod for preventing the oil from leaking out of the rod.

The torsion spring and both the threads are arranged to project the rod by the rotation of the shaft urged by the torsion spring.

In an aspect of the invention, wherein the circulating means comprises a passage provided in the rod so as to communicate the bore with the axial chamber.

The other objects and features of this invention will be apparently understood from the following description with reference to the accompanying drawings.

BRIEF DESCRIPTION OF THE DRAWINGS

FIG. 2b is a fragmentary sectional side view as viewed from the right side of FIG. 2a; and FIG. 2c is a sectional view taken along a line C—C of FIG. 2a.

DETAILED DESCRIPTION OF THE INVENTION

Figure 1:
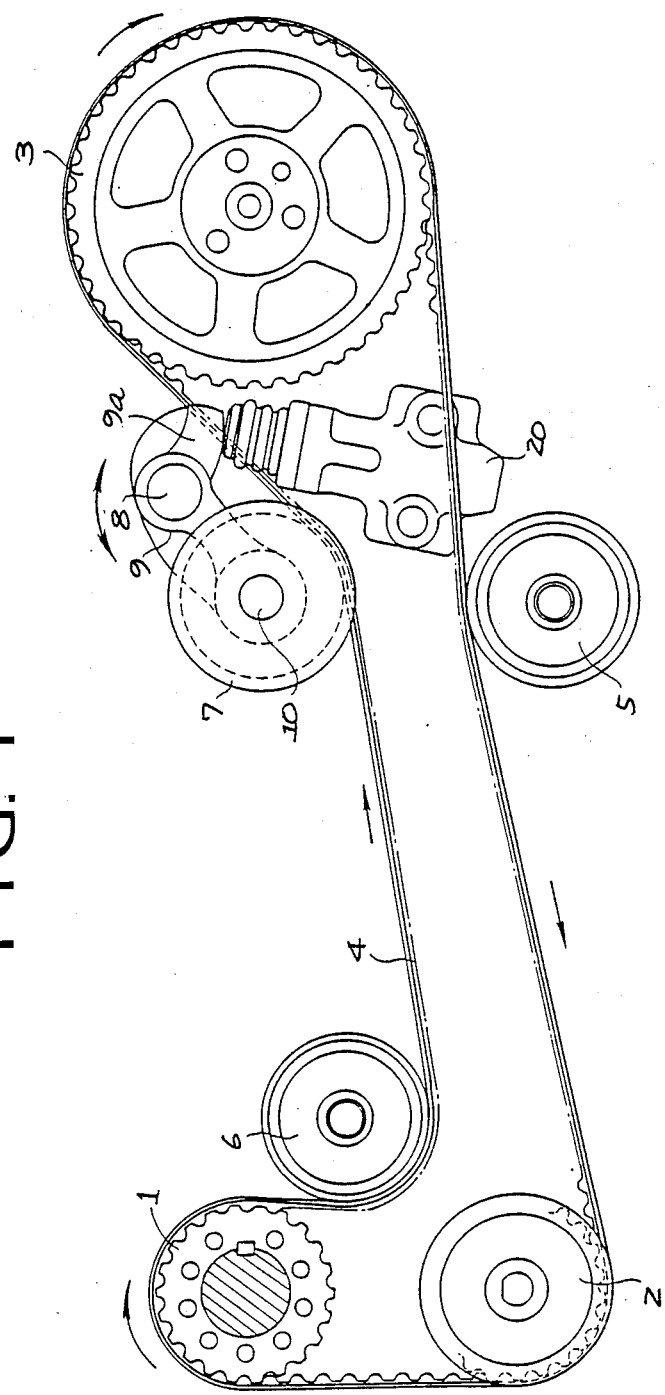
FIG. 1 is a side view showing a timing belt drive device for an engine to which the present invention is applied.

Referring to FIG. 1, a crankshaft pulley 1 is operatively connected to a camshaft pulley 3, the diameter of which is twice as large as that of the crankshaft pulley 1, through a toothed timing belt 4. An oil pump pulley 2 disposed just below the crankshaft pulley 1, and an idler pulley 5 engaged with the belt at the tight side of the run of the belt 4. An idler pulley 6 bears on the belt 4 at the slack side adjacent the crankshaft pulley 1. Thus, the belt 4 is guided in an L-shape so that the toothings thereof engages more than half of the circumference of the crankshaft pulley 1.

A tension pulley 7 is rotatably supported on a shaft 10 secured at one end of an arm 9 and rotatably mounted on a shaft 8 at the other end thereof. The tension pulley 7 bears on the belt 4 at the slack side, adjacent the camshaft pulley 3, namely at a position immediately prior to the entrance of the running belt 4 into the camshaft pulley 3 for exerting certain load thereon. The tension pulley 7 is provided to decrease the vibration of the belt 4 at the slack side, especially at a portion approaching the camshaft pulley 3. Accordingly, the belt 4 securely engages with the camshaft pulley 3, running more than half of the circumference of the pulley 3. An automatic tensioner 20 is provided adjacent to an arm 9a integral with the arm 9 opposite the tension pulley 7.

Figure 2A:
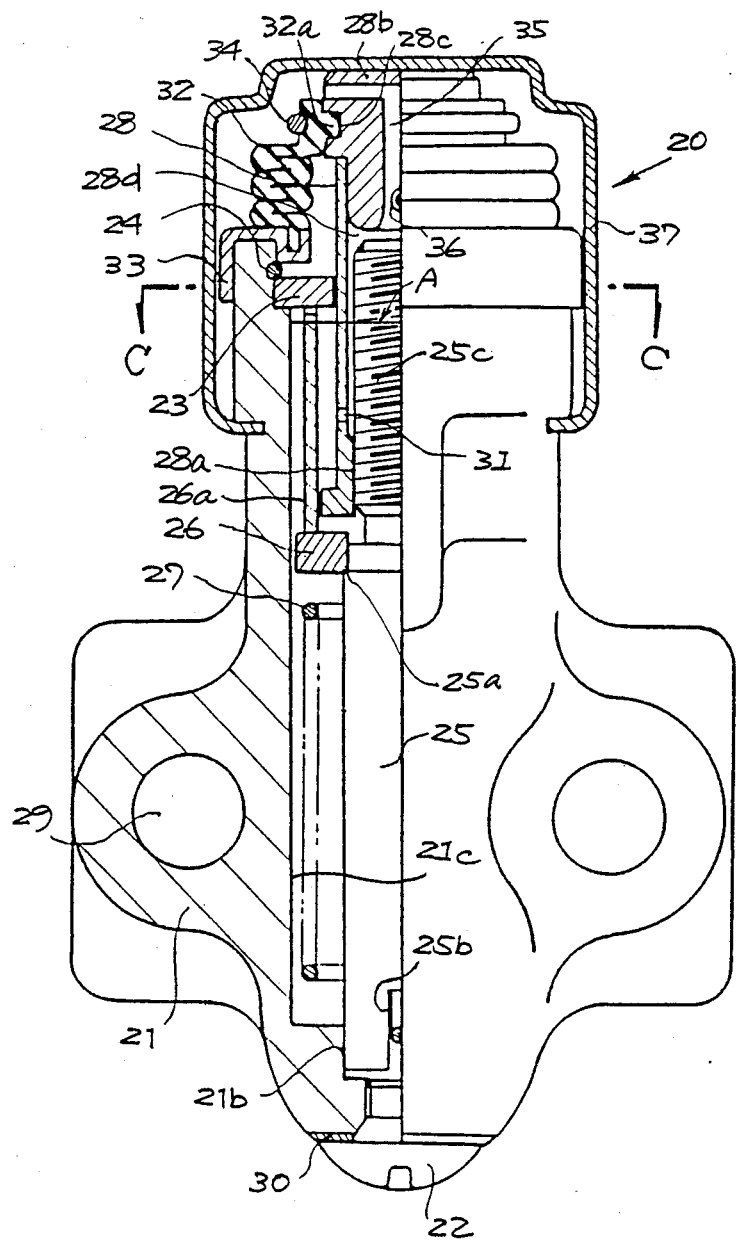
FIG. 2a is a fragmentary sectional view of an automatic tensioner of the present invention.
Figure 2B:
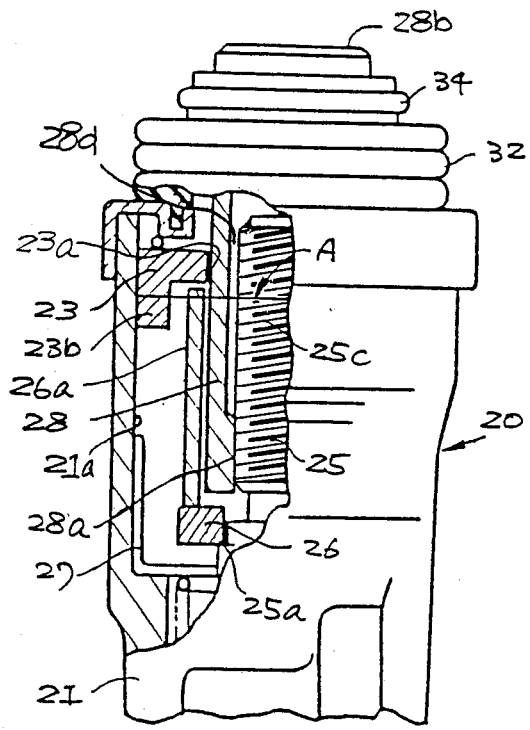

Referring to FIGS. 2a and 2b the automatic tensioner 20 has a vertical cylindrical body 21 having an axial chamber 21c. A bolt hole 29 is formed in the body 21 for fixing the tensioner 20 to an engine body. A bolt 22 is screwed in the body to cover an opening at the bottom of the body 21 through a gasket 30.

A shaft 25 is axially disposed in the chamber 21c of the body 21. A lower portion of the shaft 25 is rotatably mounted in a recess 21b formed in the body 21. The lower half of the shaft 25 has a large diameter thereby forming a circular shoulder 25a which engages an annular stopper 26 provided in the body 21. Disposed around the lower half of the shaft 25 is a torsion spring 27, one end of which is engaged with a bore 25b formed in the bottom of the shaft and the other end is engaged with a groove 21a formed in the inner wall of the body 21, as shown in FIG. 2b, so as to apply torque to the shaft 25. An external square thread 25c is formed on an upper periphery of the shaft 25.

A cylindrical rod 28 has a bore 28d and an internal thread 28a at a lower position with respect to the axial length of the bore. The rod 28 is disposed in a spacer 26a provided between stopper 26 and a bearing 23. The thread 28a of the rod 28 engages with the thread 25c of the shaft 25. The rod 28 projects upwardly out of the body 21. A head member 28b is secured to the top end of the rod 28, for abutting against the arm 9a.

Figure 2C:
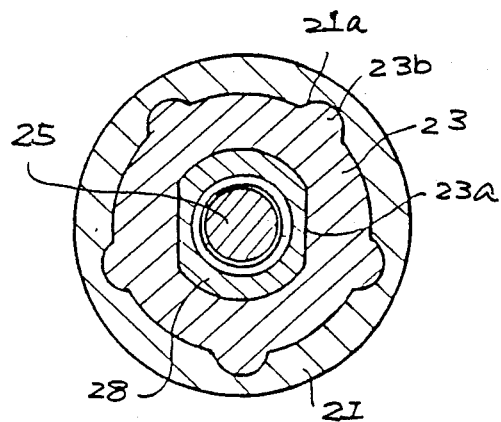

The circular bearing 23 is formed with an elongated guide opening 23a at the center and having downwardly projecting engaging legs 23b at the periphery as shown in FIGS. 2b and 2c. The bearing 23 is engaged with the rod 28 at the opening 23a and attached to an upper portion of the body 21 and secured thereto by a snap ring 24. Each engaging leg 23b engages with corresponding groove 21a formed on an upper inner periphery of the body 21. An upper portion of rod 28 has a cross section having a contour corresponding to the shape of the opening 23a of the bearing 23, so that the rod 28 can be axially moved without rotating. The spring 27 and threads 25c and 28a are so arrange that when the shaft 25 is rotated by spring 27, the rod 28 projects upwardly.

A low viscosity lubricating oil A is contained in the chamber 21c of the body 21 to a level immediately below the bearing 23. A radial oil passage 31 is formed in the wall of the rod 28 at a portion above the engaging portion of the threads 25c and 28a so as to communicate the chamber 21c with a space formed between the shaft 25 and the rod 28. In order to prevent the oil from leaking out of the body, a bellows 32 is provided between the head member 28b and the body 21. The lower end of the bellows is welded to a cap 33, which is engaged with the body 21. A projection 32a formed on the inner periphery at the upper end of the bellows 32 is embedded in a recess 28c of the head member 28b and secured thereto by a spring band 34.

A T-shaped air passage 35 is formed in the head member 28b of the rod 28 at a portion above the level of the oil A. A hole 36 is formed in the wall of the rod 28 to communicate the air passage 35 with the interior of the bellows 32 to prevent the inside of the rod 28 from becoming vacuum when the inner capacity thereof increases as the rod 28 is extended.

A holder 37 shown in FIG. 2a holds the rod 28 at the most retracted position prior to the assemblage of the tensioner 20. The holder 37 is removed at the assemblage, causing the rod 28 to abut against the arm 9a.

In operation, the rod 28 is urged by spring 27 to project, thereby pushing the end arm 9a and rocking the arm 9 about the shaft 8 so that the tension pulley 7 is urged against the timing belt 4. At a position where component of rotary force generated by the reaction of the belt 4 at the thread 28a balances with the torque of the torsion spring 27, the tension pulley 7 is held to provide a proper belt tension. When the crankshaft pulley 1 is rotated, the timing belt 4 guided by the idler pulleys 5 and 6 and the tension pulley 7 drives the camshaft pulley 3 and the oil pump pulley 2 in synchronism with the crankshaft pulley 1.

When load on the slack side of the belt 4 is decreased, for example, at the start of the engine, rod 28 is temporarily projected. During the normal operation of the engine, the rod 28 is projected and retracted in accordance with expansion of the belt at warm-up and with contraction of the belt at cold starting. Accordingly, the tension of the belt is automatically kept at a predetermined value by the tension pulley 7.

When the rod 28 is projected to increase the volume of the space in the rod and the inner capacity of the bellows 32, oil A in the chamber 21c flows through the oil passage 31 into the space between the rod 28 and the shaft 25. Thus, the levels of the oil A in the outer and inner sides of the rod 28 are kept equal. At the same time, air is inducted into the rod 28 through the air passage 35, and further into the interior of the bellows 32 through the hole 36.

To the contrary, when the rod 28 is retracted to decrease the space, the oil A in the space returns to the chamber 21c through the passage 31 while the air in the bellows 32 and the rod 28 is discharged through the air passage 35. Since the level of the oil A is always above the threads 28a and 25c, the threads are thoroughly lubricated.

In accordance with the present invention, there is provided an automatic tensioner which can be applied to a timing belt since lubricating oil is trapped inside the tensioner by reliable sealing means. Further, since the tensioner can be independently used, extensive usage is possible. The threads of the rod and the shaft are constantly dampened by the oil for sufficient lubrication so that proper operating condition can be maintained. Since the top of the rod is disposed at an upper portion of the tensioner, reliable sealing of the rod can be provided.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:
1. An automatic belt tensioner comprising:
a substantially vertically disposed cylindrical body having an axial chamber;
a shaft having an external thread and rotatably mounted in the axial chamber of the body;
a torsion spring provided between the body and the shaft so as to urge the shaft in a rotational direction;
a cylindrical rod having an axial bore and an internal thread engaged with the external thread of the shaft,
an upper end of the rod being projected from the body so as to be operatively connected to a tension pulley for a belt;
holding means for holding the rod so as to permit axial movement of the rod;
means for circulating oil between the axial chamber of the body and the bore of the rod at a portion above the internal thread of the rod;
sealing means provided between the body and the rod for preventing the oil from leaking out of the rod;
the torsion spring and both the threads being arranged to project the rod by the rotation of the shaft urged by the torsion spring.
2. The automatic belt tensioner according to claim 1 wherein the circulating means comprises a passage provided in the rod so as to communicate the bore with the axial chamber.
3. The automatic belt tensioner according to claim 1 further comprising an air passage provided in the shaft to communicate the bore with the atmosphere.

* * * * *